UNITED STATES PATENT OFFICE.

CHARLES H. MacDOWELL, OF CHICAGO, ILLINOIS, AND HERBERT H. MEYERS, OF PITTSBURGH, PENNSYLVANIA; SAID MEYERS ASSIGNOR TO ARMOUR FERTILIZER WORKS, OF CHICAGO, ILLINOIS, A CORPORATION OF NEW JERSEY.

CATALYST.

1,420,203.   Specification of Letters Patent.   Patented June 20, 1922.

No Drawing.   Application filed January 20, 1919. Serial No. 272,155.

*To all whom it may concern:*

Be it known that we, CHARLES H. MAC-DOWELL and HERBERT H. MEYERS, citizens of the United States, residing at Chicago, county of Cook, State of Illinois, and Pittsburgh, Allegheny County, State of Pennsylvania, respectively, have invented certain new and useful Improvements in Catalysts; and we do hereby declare the following to be a full, clear, and exact description of the invention, such as will enable others skilled in the art to which it appertains to make and use the same.

This invention relates to improvements in catalysts, and has for its object the provision of an improved catalyst.

The catalyst of the present invention is particularly adapted for use in the catalytic production of sulfuric acid, in the catalytic oxidation of ammonia and in similar catalytic processes. In the catalytic production of sulfuric acid (sulfuric trioxide), it has been the common practice, in so far as we are aware, to make use of platinum, or iron oxide, or both, as the catalytic substances. While the use of certain vanadium compounds as catalytic agents has long been recognized, as far as we are aware, this property of vanadium compounds has been largely regarded in the light of an interesting scientific phenomenon and little, if any, effort has heretofore been made for effectively utilizing this property of vanadium compounds.

The improved catalyst of the present invention is a composite catalyzer and is made up of a compound of vanadium and a compound of aluminum in which each compound contributes to the catalytic activity. In its preferred form, the improved catalyst comprises an intimate mixture of vanadium oxide and alumina resulting from the calcination and leaching of alunite. While we prefer to use alumina from alunite, it is to be understood that good results can be obtained by the use of alumina or aluminum oxide from other sources. The composite catalyst of the present invention can be prepared in various ways. Thus, for example, a satisfactory catalyst can be obtained by mixing about ten parts of ammonium vanadate very intimately with about one hundred parts of alumina obtained by the calcination and leaching of alunite. We prefer to moisten the mixture of ammonium vanadate and alumina with just enough water to permit of moulding, and to then briquette the mixture into suitable shapes. These briquettes are first air dried and are then heated under suitable conditions to decompose the ammonium vanadate into vanadium pentoxide ($V_2O_5$). The heating of the dry briquettes for the decomposition of the ammonium vanadate can be effected in the catalytic operation in which the resulting composite catalyst is to be employed, as, for example, in the apparatus to be used in the catalytic oxidation of ammonia or in the apparatus to be used for the manufacture of contact sulfuric acid.

The alumina from alunite is a particularly advantageous form of alumina for use in the production of the composite catalyst of the present invention. Such alumina is readily obtainable at low expense and in large amount by the calcination of alunite and the leaching of the calcine. This calcination and leaching operation involves the separation from the original alunite of a large proportion of water-soluble material, but this separation takes place without a corresponding decrease in volume of the remaining alumina and, in fact, the alumina remains of nearly the original volume of the alunite. This alumina is, moreover, of an exceedingly porous character, and is of such a fine state of subdivision that it will, for the most part, go through a two hundred mesh sieve. It is admirably well adapted for admixture with the vanadium compound and for subsequent molding and formation into briquettes.

The alumina from alunite is, moreover, advantageous because of its favorable influence upon the catalytic activity of the resulting composite catalyst. We have determined that the alumina itself acts as a catalytic agent. The alumina, therefore, performs a double function in the composite catalyst since, in addition to possessing catalytic properties itself, it serves as a very effective carrier for the vanadium compound. As far as we have been able to determine, any form of alumina will perform this double roll, but we have found the alumina from alunite best suited for these purposes.

Instead of employing vanadium compounds such as ammonium vanadate as the source of the vanadium oxide, vanadium ores, if of the proper composition, may also be employed. The vanadium ores which we have used to advantage in the production of the composite catalyst contain an amount of vanadium corresponding to about 30% vanadium pentoxide ($V_2O_5$), together with small amounts of various substances, such as nickel, molybdenum, iron, aluminum, etc., in an oxidized state, and usually small amounts of sulfur and carbonaceous material, as well as insoluble gangue usually of silicious character. When the raw vanadium ore contains sulfides, it is first roasted in order to convert these sulfides into oxides, and the roasted ore may contain a mixture of various oxides of vanadium besides the pentoxide.

The vanadium ore is ground to a fineness corresponding to about 100 mesh, or finer, and intimately mixed with about once or twice its weight of very fine alumina, preferably from alunite, sufficient water being added to form a thick paste or plastic mass, which will permit handling and moulding. This mixture is then moulded without any added binder and under just enough pressure so that the moulded briquette or other product will hold together and stand handling. The briquettes are then air-dried and are then ready to be charged into the catalytic apparatus. The dry briquettes are gradually heated, usually during a period of several hours, to bring them to a working temperature and to bring about conversion of the lower oxides of vanadium into the pentoxide, and the elimination of certain other ingredients from the catalyst, as, for example, carbonaceous material. During this heating air is blown through to drive off the moisture and to assist in the oxidation. In the production of a catalyst for the manufacture of sulfuric acid, a mixture of sulfur dioxide and air or other oxidizing gas is passed into contact with the composite catalyzer at a temperature appropriate to the catalytic oxidation, for example, at a temperature of around 540–575° C. For a considerable time the sulfur dioxide passed into contact with the composite catalyzer is substantially all absorbed thereby, due, as we believe, to the absorbent or adsorbent action of the alumina upon the sulfur dioxide. Upon the further passage of sulfur dioxide mixed with air into contact with the composite catalyzer, and after absorption or adsorption to saturation has taken place, the formation and escape of sulfur trioxide will take place. The action of the composite catalyst accordingly seems to involve the accumulation of sulfur dioxide therein as a preliminary to, or as an adjunct of, catalytic oxidation. In fact, in the operation of the process there is a tendency for the absorption by the composite catalyst of sulfur dioxide and the evolution of sulfur trioxide to take place in more or less separate and successive phases, although by proper regulation of the temperature an approximately constant catalytic oxidation can be effected.

For the catalytic production of sulfuric acid, the temperature of operation is preferably about 550° C. The heating of the catalytic body may be effected directly by the hot gases from the sulfur dioxide generator, or preheating of the reacting gases may be resorted to. The heat of reaction will help to maintain the desired temperature. The air employed for the oxidation should preferably be well dried, for example, with sulfuric acid. The catalytic process is improved by operating under a pressure somewhat above the atmospheric pressure.

In the composite catalyst of the present invention, the vanadium oxide is intimately distributed or diffused throughout the alumina, and owing to the exceedingly porous character of the alumina from alunite, there is presented a large amount of active surfaces to the reacting gases. Moreover, the alumina itself, owing to its catalytic properties, contributes to the catalytic action of the vanadium oxide with resulting advantage to the catalytic process as a whole.

In the catalytic manufacture of sulfuric acid the increased volume of the composite catalyst and its porous character give a prolonged period of contact of the reacting gases passing therethrough, and this prolonged contact of the catalyst and reacting gases is of particular advantage in the manufacture of sulfuric acid. It is one of the advantages of the platinum process of producing sulfuric acid that a short time of contact of the reacting gases suffices for the nearly complete conversion of the sulfur dioxide into sulfur trioxide. When vanadium oxide is employed as the contact substance in the oxidation of sulfur dioxide, its action is much slower than that of platinum, and a correspondingly longer contact of the reacting gases with the catalytic body is required, or a corresponding larger volume of catalyst is needed, so that the necessary contact may be secured during the passage of the gaseous mixture therethrough. The porous character of our composite catalyst, particularly when made of alumina from alunite, is of very material advantage in ensuring a sufficient contact of the reacting gases with the catalytic body. Inasmuch as the alumina from alunite is readily obtainable in large amount and forms the greater portion of the composite catalyst, a large volume of catalyst can be provided at small cost and of high catalytic activity, so that a sufficiently prolonged period of contact of the reacting gases therewith can be provided without objectionable decrease in the rate of flow of such gases.

Instead of using the alumina from calcined alunite, alumina from other sources can similarly be employed, as, for example, alumina from bauxite, or precipitated alumina. However, we do not regard these other forms of alumina as advantageous as that from alunite for the purposes of the present invention, for the reasons already mentioned, and, in addition, such forms of alumina are usually available only at increased expense. The aluminum compound of the composite catalyst need not, in fact, be alumina, and we have found that raw alunite itself can be very advantageously admixed with the vanadium compound. Alunite itself possesses catalytic activity, and in combination with the vanadium compound contributes to the total catalytic activity of the composite catalyst.

The composite catalyst of the present invention made up of vanadium oxide and alumina from alunite, for example, in the proportions of about 10% of vanadium oxide and 90% of alumina, provides an improved catalyst in which the vanadium oxide is intimately admixed and combined with the alumina with the corresponding increase of volume of the composite catalyst, and in which the catalytic action of the vanadium oxide is supplemented by the catalytic action of the alumina. Alumina from alunite is itself an effective catalyst, for the production of contact sulfuric acid, and its use alone enables a conversion of around 50 to 60% to be obtained. When used in admixture with the vanadium oxide, it still exerts its catalytic action, and at the same time serves to give to the vanadium oxide an increased volume and correspondingly improved catalytic activity. As a result, the composite catalyst enables a high conversion of sulfur dioxide to sulfur trioxide to be effected, for example, up to about 87% or even higher.

In addition to the raw vanadium ores, previously mentioned, the vanadium compound of the composite catalyst may be obtained from concentrates of various kinds and metallurgical by-products. For example, the vanadium oxide and the vanadic acid by-products from the treatment of carnotite ores for their radium content answer the purpose exceedingly well. The main consideration is a sufficiently high vanadium content to give the composite catalyzer the requisite amount of vanadium pent-oxide. For example, with a raw ore running 30% ($V_2O_5$), we would use a mixture of 50% ore and 50% of alumina residue from the leaching of calcined alunite. With a by-product running 85% ($V_2O_5$), we would use a mixture which would give about 10% ($V_2O_5$) in the finished catalyst.

While we have particularly specified the presence of about 10% of vanadium pent-oxide in our improved catalyst, it is to be understood that we do not intend to limit ourselves to this particular percentage, since the percentage of the vanadium, as well as the aluminum, compound in the catalyst can be varied without departing from the principle and spirit of the invention.

We claim:

1. A composite catalyst comprising vanadium oxide and alumina intimately admixed with each other.

2. A composite catalyst comprising vanadium oxide and alumina from calcined alunite.

3. An improved catalyst comprising a porous briquette containing vanadium oxide and alumina from calcined alunite.

4. A composite catalyst comprising a compound of vanadium and a compound of aluminum in which each compound contributes to the catalytic activity.

5. An improved catalyst comprising a porous briquette containing a compound of vanadium and a compound of aluminum in which each compound contributes to the catalytic activity.

6. A composite catalyst containing about 10% of vanadium oxide and about 90% of alumina.

In testimony whereof we affix our signatures.

CHARLES H. MacDOWELL.
HERBERT H. MEYERS.